United States Patent
Kiyasseh et al.

(10) Patent No.: US 12,002,202 B2
(45) Date of Patent: Jun. 4, 2024

(54) META-LEARNING FOR CARDIAC MRI SEGMENTATION

(71) Applicant: Merck Sharp & Dohme LLC, Rahway, NJ (US)

(72) Inventors: Dani Kiyasseh, Marina del Rey, CA (US); Antong Chen, Blue Bell, PA (US); Albert Joseph Swiston, Jr., Somerville, MA (US); Ronghua Chen, Needham, MA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 439 days.

(21) Appl. No.: 17/397,334

(22) Filed: Aug. 9, 2021

(65) Prior Publication Data

US 2023/0040908 A1 Feb. 9, 2023

(51) Int. Cl.
*G06T 7/00* (2017.01)
*G06N 3/045* (2023.01)
(Continued)

(52) U.S. Cl.
CPC ........... *G06T 7/0012* (2013.01); *G06N 3/045* (2023.01); *G06N 3/08* (2013.01); *G06T 7/11* (2017.01);
(Continued)

(58) Field of Classification Search
CPC ...................... G06T 7/0012; G06T 7/11; G06T 2207/20076; G06T 2207/20081;
(Continued)

(56) References Cited

U.S. PATENT DOCUMENTS 11,657,419 B2 * 5/2023 Eder ..................... G06F 3/0484
345/418
2018/0285766 A1 10/2018 Shen et al.
(Continued)

FOREIGN PATENT DOCUMENTS

JP 2021111101 A 8/2021
WO WO 2020/154562 A1 7/2020

OTHER PUBLICATIONS

Bai, W. et al. "Self-Supervised Learning for Cardiac MR Image Segmentation by Anatomical Position Prediction." International Conference on Medical Image computing and Computer-Assisted Intervention—MICCAI 2019, Lecture Notes in Computer Science, vol. 11765, Oct. 2019, pp. 541-549.
(Continued)

*Primary Examiner* — MD K Talukder
(74) *Attorney, Agent, or Firm* — Fenwick & West LLP (57) ABSTRACT

Methods and systems are described for image segmentation. A machine learning model is applied to a set of images to generate results. The results may be obtained as a probability map for each image in the set of images. The model may be trained by accessing a set of labeled images, each image associated with a label indicating a location of a feature within a respective image. An initial set of parameters is accessed. An encoder is initialized with the initial set of parameters. The encoder is applied to the set of labeled images to generate a prediction of a feature location within each image. The initial set of parameters are updated based on the predictions and the label associated with the labeled images. The updated set of parameters and an additional set of parameters generated using a set of unlabeled images are aggregated.

20 Claims, 6 Drawing Sheets

(51) Int. Cl.
G06N 3/08 (2023.01)
G06T 7/11 (2017.01)
(52) U.S. Cl.
CPC ............... G06T 2207/20076 (2013.01); G06T 2207/20081 (2013.01); G06T 2207/20084 (2013.01); G06T 2207/30048 (2013.01)
(58) Field of Classification Search
CPC  G06T 2207/20084; G06T 2207/30048; G06N 3/045; G06N 3/08; G06N 3/0455; G06N 3/0895; G06N 3/0985; G06V 10/26; G06V 10/82
See application file for complete search history.

(56) References Cited

U.S. PATENT DOCUMENTS

2019/0244108 A1   8/2019  Meyerson et al.
2021/0133572 A1   5/2021  Choi et al.
2021/0312217 A1*  10/2021 Nater .................... G06K 7/1408

OTHER PUBLICATIONS

Chen, C. et al. "Deep Learning for Cardiac Image Segmentation: A Review." Frontiers in Cardiovascular Medicine, vol. 7, Article 25, Mar. 2020, pp. 1-33.
Chen, C. et al. "Synergistic Image and Feature Adaptation: Towards Cross-Modality Domain Adaptation for Medical Image Segmentation." Proceedings of the AAAI Conference on Artificial Intelligence, vol. 33, No. 1, Jul. 17, 2019, pp. 865-872.
Chen, C. et al. "Unsupervised Multi-Modal Style Transfer for Cardiac MR Segmentation." International Workshop on Statistical Atlases and Computation Models of the Heart—STACOM 2019, Oct. 2019, pp. 209-219.
Chen, L. C. et al. "Rethinking Atrous Convolution for Semantic Image Segmentation." arXiv Preprint arXiv:1706.05587v3, Dec. 5, 2017, pp. 1-14.
Chen, T. et al. "A Simple Framework for Contrastive Learning of Visual Representations." Proceedings of Machine Learning Research, vol. 119, 2020, pp. 1-11.
Chen, T. et al. "Big Self-Supervised Models are Strong Semi-Supervised Learners." 34th Conference on Neural Information Processing Systems (NeurIPS 2020), Vancouver, Canada, Dec. 6-12, 2020, pp. 1-13.
Dou, Q. et al. "Pnp-AdaNet: Plus-and-Play Adversarial Domain Adaptation Network at Unpaired Cross-Modality Cardiac Segmentation." IEEE Access, vol. 7, Jul. 16, 2019, pp. 99065-99076.
Duan, J. et al. "Automatic 3D Bi-Ventricular Segmentation of Cardiac Images by a Shape-Refined Multi-Task Deep Learning Approach." IEEE Transactions on Medical Imaging, vol. 38, No. 9, Sep. 2019, pp. 2151-2164.
Feyjie, A. R. et al. "Semi-Supervised Few-Shot Learning for Medical Image Segmentation." arXiv Preprint arXiv:2003.08462v2, Apr. 9, 2020, pp. 1-10.
Flennerhag, S. et al. "Transferring Knowledge Across Learning Processes." Proceedings of International Conference on Learning Representations, ICLR 2019, pp. 1-23.
Ghosh, S. et al. "Automated Left Atrial Segmentation from Magnetic Resonance Image Sequences Using Deep Convolutional Neural Network with Autoencoder." 2020 IEEE 17th International Symposium on Biomedical Imaging (ISBI), Apr. 3-7, 2020, pp. 1756-1760.
Grimson, W. et al. "Federated Healthcare Record Server—The Synapses Paradigm." International Journal of Medical Informatics, vol. 52, No. 1-3, Oct. 1998, pp. 3-27.
Howard, A. et al. "Searching for MobileNetV3." Proceedings of the IEEE International Conference on Computer Vision, Oct. 27-Nov. 2, 2019, pp. 1314-1324.
Jamaludin, A. et al. "Self-Supervised Learning for Spinal MRIS." Deep Learning in Medical Image Analysis and Multimodal Learning for Clinical Decision, Lecture Notes in Computer Science, vol. 10553, Sep. 2017, pp. 294-302.
Kairouz, P. et al. "Advances and Open Problems in Federated Learning." Foundations and Trends in Machine Learning, vol. 14, No. 1-2, arXiv:1912.04977v3, Mar. 9, 2021, pp. 1-121.
Li, L. et al. "Joint Left Atrial Segmentation and Scar Quantification Based on a DNN with Spatial Encoding and Shape Attention." International Conference on Medical Image Computing and Computer-Assisted Intervention—MICCAI 2020, Jun. 2020, pp. 118-127.
Mcmahan, B. et al. "Communication-Efficient Learning of Deep Networks from Decentralized Data." Proceedings of the 20th International Conference on Artificial Intelligence and Statistics, PMLR, vol. 54, Apr. 20-22, 2017, pp. 1-10.
Mondal, A. K. et al. "Few-Shot 3D Multi-Modal Medical Image Segmentation Using Generative Adversarial Learning." arXiv Preprint arXiv: 1810.12241v1, Oct. 29, 2018, pp. 1-10.
Nichol, A. et al. "Reptile: A Scalable Metalearning Algorithm." arXiv Preprint arXiv:1803.02999v1, Mar. 8, 2018, pp. 1-11.
Ouyang, C. et al. "Data Efficient Unsupervised Domain Adaptation for Cross-Modality Image Segmentation." International Conference on Medical Image Computing and Computer-Assisted Intervention—MICCAI 2019, arXiv: 1907.02766v2, Aug. 12, 2019, pp. 669-677.
Panfilov, E. et al. "Improving Robustness of Deep Learning Based Knee MRI Segmentation: Mixup and Adversarial Domain Adaptation." Proceedings of the IEEE/CVF International Conference on Computer Vision (ICCV), Oct. 27-28, 2019, pp. 1-10.
Pillutla, K. et al. "Robust Aggregation for Federated Learning." with Supplementary Material, arXiv Preprint arXiv:191213445v1, Dec. 31, 2019, pp. 1-38.
Ronneberger, O. et al. "U-Net: Convolutional Networks for Biomedical Image Segmentation." International Conference on Medical Image Computing and Computer-Assisted Intervention—MICCAI 2015, Lecture Notes in Computer Science vol. 9351, Nov. 18, 2015, pp. 234-241.
Tseng, W.-Y. I. et al. "Introduction to Cardiovascular Magnetic Resonance: Technical Principles and Clinical Applications." Acta Cardiologica Sinica, vol. 32, No. 2, Mar. 2016, pp. 129-144.
Van Den Oord, A. et al. "Representation Learning with Contrastive Predictive Coding." arXiv Preprint arXiv:1807.03748v2, Jan. 22, 2019, pp. 1-13.
Wang, S. et al. "LT-Net: Label Transfer by Learning Reversible Voxel-Wise Correspondence for One-Shot Medical Image Segmentation." Proceedings of the IEEE/CVF Conference on Computer Vision and Pattern Recognition (CVPR), Jun. 13-19, 2020, pp. 9162-9171.
Xiong, Z. et al. "Fully Automatic Left Atrium Segmentation from Late Gadolinium Enhanced Magnetic Resonance Imaging Using a Dual Fully Convolutional Neural Network." IEEE Transactions on Medical Imaging, vol. 38, No. 2, Feb. 2019, pp. 515-524.
Yu, H. et al. "FOAL: Fast Online Adaptive Learning for Cardiac Motion Estimation." Proceedings of the IEEE/CVF Conference on Computer Vision and Pattern Recognition (CVPR), Jun. 13-19, 2020, pp. 4313-4323.
Yu, L. et al. "Uncertainty-Aware Self-Ensembling Model for Semi-Supervised 3D Left Atrium Segmentation." International Conference on Medical Image Computing and Computer-Assisted Intervention—MICCAI 2019, Jul. 16, 2019, pp. 605-613.
Yue, Q. et al. "Cardiac Segmentation from LGE MRI Using Deep Neural Network Incorporating Shape and Spatial Priors." International Conference on Medical Image Computing and Computer-Assisted Intervention—MICCAI 2019, Jun. 2019, pp. 559-567.
Zhai, X. et al. "S4L: Self-Supervised Semi-Supervised Learning." Proceedings of the IEEE/CVF International Conference on Computer Vision (ICCV), Oct. 27-Nov. 2, 2019, pp. 1476-1485.
Zhang, X. et al. "Fully Automated Left Atrium Segmentation from Anatomical Cine Long-Axis MRI Sequences Using Deep Convolutional Neural Network with Unscented Kalman Filter." Medical Image Analysis, vol. 68, Feb. 2021, pp. 1-18.
Zhao, A. et al. "Data Augmentation Using Learned Transformations for One-Shot Medical Image Segmentation." Proceedings of the (56) References Cited

OTHER PUBLICATIONS

IEEE/CVF Conference on Computer Vision and Pattern Recognition (CPR), Jun. 15-20, pp. 8543-8553.
Zotti, C. et al. "Convolutional Neural Network with Shape Prior Applied to Cardiac MRI Segmentation." IEEE Journal of Biomedical and Health Informatics, vol. 23, No. 3, May 2019, pp. 1119-1128.
PCT International Search Report and Opinion, PCT Application No. PCT/US2022/039350, dated Nov. 18, 2022, 9 pages.

* cited by examiner

META-LEARNING FOR CARDIAC MRI SEGMENTATION

BACKGROUND

1. Technical Field

The subject matter described relates generally to the field of image processing and, in particular, to meta-learning for cardiac MRI segmentation.

2. Background Information

Current segmentation systems that exclusively use supervised learning are vulnerable to distribution shift, a phenomenon in which data are used for training and evaluation belong to different distributions. This phenomenon causes network performance degradation and is common in the context of cardiac magnetic resonance imaging (MM), where scans exhibit a high degree of variability. Such variability is a result of the various modalities different medical institutes use, the different magnetic field strengths of different MRI devices, and the dissimilarities among patient cohorts and demographics. Common workarounds include retraining segmentation models on a representative dataset and/or training multiple specialized models for different target datasets. However, these are not always possible due to patient privacy concerns and/or the paucity of labeled cardiac scans.

SUMMARY

The image segmentation system described herein tackles the obstacles posed by distribution shift and the lack of labeled data. The image segmentation system utilizes self-supervised learning, semi-supervised learning, and meta-learning. Self-supervised learning aims to learn high-level representations from abundant unlabeled data, and semi-supervised learning exploits both labeled and unlabeled data to learn task-relevant representations. Finally, optimization based meta-learning learns a parameter initialization, such as a neural network parameter initialization, to allow for fast adaptation on a target task of interest.

In various embodiments, a method for segmenting images includes applying a trained machine learning model to a set of images to generate results. The method further includes obtaining the results of the machine learning model as a probability map for each image in the set of images. In some embodiments, the machine learning model was trained by initializing a first encoder, such as a task-specific inner loop associated with a first task, with a first set of parameters. The machine learning model was further trained by applying the first encoder to a set of unlabeled images to generate a set of representations. The first set of parameters is updated based on the set of representations. For example, the first set of parameters may be updated with a task-specific objective function, such as the contrastive loss.

The machine learning model was further trained by initializing a second encoder, such as a task-specific inner loop associated with a second task with a second set of parameters. The second encoder is applied to a set of labeled images to generate a second set of predictions of a location of a feature within each image in the set of labeled images. The second set of parameters is updated based on the second set of predictions. The parameters are aggregated into a set of aggregated parameters. The first set of parameters are updated based on the aggregated parameters.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

EXAMPLE SYSTEMS

Figure 1:
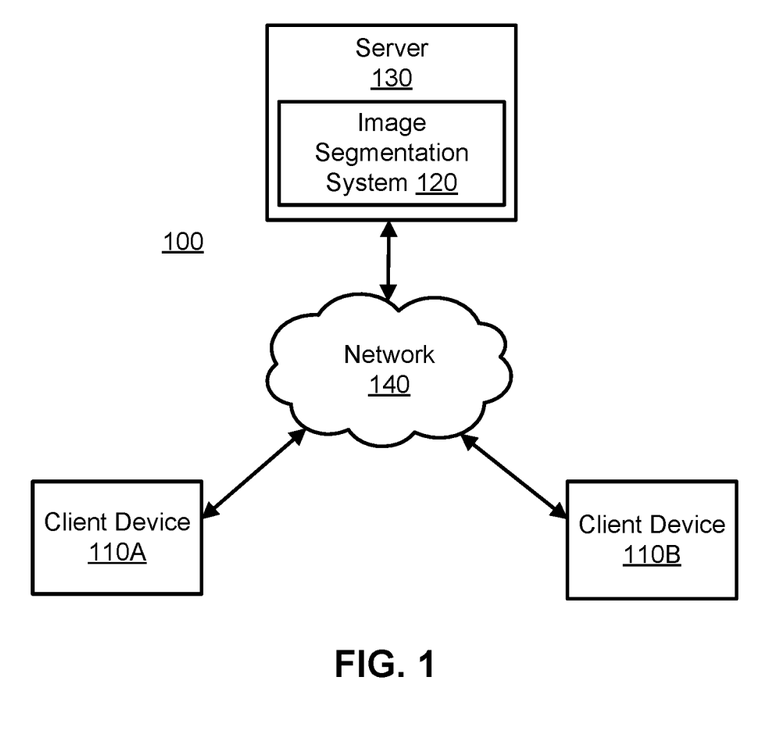
FIG. 1 illustrates a diagram of a system environment of an image segmentation system, according to one embodiment.

FIG. 1 illustrates one embodiment of a system environment 100 for an image segmentation system 120. In the embodiment shown, the system environment includes client devices 110A, 110B, an image segmentation system 120 stored on a server 130, and a network 140. In other embodiments, the system environment 100 contains different and/or additional elements. In addition, the functions may be distributed among the elements in a different manner than described.

Client devices 110A, 110B are computing devices capable of receiving user input, receiving and/or transmitting data, including image and image data, via the network 140, testing, training, and applying various machine learning models, and the like. Users of client devices 110A, 110B may be medical centers, research facilities, organizations, or the like that produce and analyze images and image data, such as magnetic resonance imaging (MM) data and computed tomography (CT) data.

In one embodiment, a client device, such as client devices 110A, 110B, is a conventional computer system, such as a desktop or a laptop computer. Alternatively, a client device may be a portable device having computer functionality, such as a smartwatch, personal digital assistant (PDA), a mobile telephone, a smartphone, or another suitable device. A client device is configured to communicate via the network 140. In one embodiment, a client device 110A, 110B executes an application allowing a user of the client device 110A, 110B to interact with the image segmentation system 120. For example, a client device 110A, 110B executes a browser application to enable interaction between the client device 110A, 110B and the image segmentation system 120 via the network 140. In another embodiment, a client device 110A, 110B interacts with the image segmentation system 120 through an application programming interface (API) running on a native operating system of the client device 110A, 110B, such as IOS® or ANDROID™.

The client devices 110A, 110B are configured to communicate via the network 140, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The image segmentation system 120, stored on one or more servers, such as server 130, performs various analyses on images and image data. In one aspect, the image segmentation system 120 segments images (e.g., MRI images, CT images, etc.) and/or optimizes image segmentation models using self-supervised, semi-supervised meta-learning. In some embodiments, the image segmentation system 120 trains a portion of an image segmentation model at the server 130. One or more users of the image segmentation system 120 may retrieve the trained portion of the image segmentation model from the server 130. The one or more users, using client devices 110A, 110B, may then train one or more additional portions of the image segmentation model with additional image data. The additional image data may be private to the one or more users and/or publicly available image data. In addition, the additional data may be unlabeled or labeled. Labeled data, such as labeled images may include a label indicating a location of a feature within the image, an intensity of the feature, a type of feature, or the like. Labeled data may be used during supervised and/or semi-supervised training. In some embodiments, the image segmentation system 120 retrieves the portions of the image segmentation models that are trained locally on client devices 110A, 110B over the network 140. For example, the image segmentation system 120 may retrieve parameters obtained during local training. The image segmentation system 120 may then aggregate model parameters, update image segmentation models, generate new segmentation models, or the like, which may then be retrieved by client devices 110A, 110B.

The bifurcated training allows users to optimize the image segmentation models based on the imaging equipment available to the one or more users, the preferred imaging settings and modalities of the one or more users, the type of image being taken, the chamber type of the subject of the image (e.g., left ventricle endocardium, left ventricle myocardium, right ventricle endocardium, left atrium endocardium, etc.), the species of the subject in the image (e.g., human, porcine, etc.), the demographics of the subjects, or the like. In addition, by training portions of the image segmentation model locally, patient privacy is preserved by limiting a model's direct access to sensitive patient health information.

Alternatively, or additionally, the image segmentation system 120 may train and test all portions of an image segmentation model. In these embodiments, client devices 110A, 110B may receive model parameters from trained models to use locally. In addition, the image segmentation system 120 may retrieve and aggregate images, image data, model parameters or the like from one or more client devices 110A, 110B to iteratively train and test image segmentation models, optimize and/or update additional models, or the like.

Figure 2:
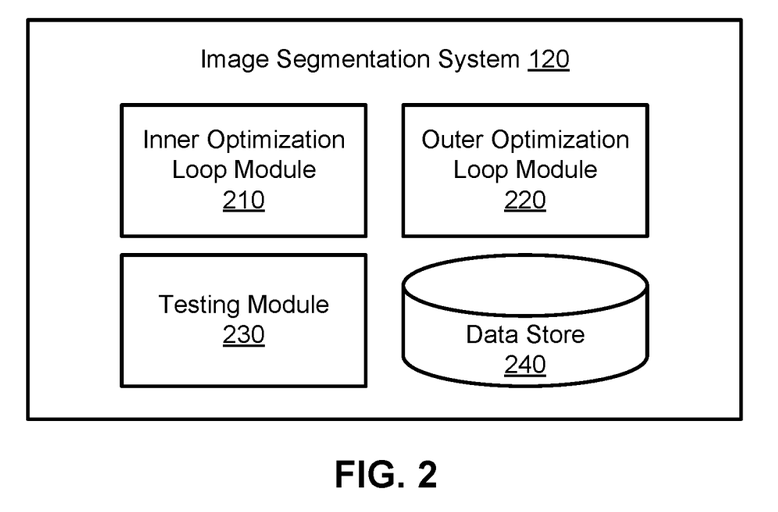
FIG. 2 is a block diagram of an architecture of the image segmentation system, according to one embodiment.

FIG. 2 is a block diagram of an architecture of an image segmentation system 120, in accordance with an embodiment. In the embodiment shown, the image segmentation system 120 includes an inner optimization loop module 210, an outer loop optimization module 220, a testing module 230, and a data store 240. The functions of the image segmentation system 120 may be distributed among the elements in a different manner than described. In various embodiments, the image segmentation system 120 may include different, additional, and/or fewer components. Each of the various data stores may be a single storage device, a server controlling multiple storage devices, or a distributed network that is accessible through multiple nodes (e.g., a cloud storage system).

The image segmentation system 120 may use meta-learning to allow for fast adaptation of a model on a task of interest. Tasks may include, but are not limited to, classification, regression, or the like. Tasks may consist of data that are either labeled or unlabeled. In some embodiments, meta-learning consists of two stages: meta-training and meta-testing.

In meta-training, learning tasks, T, are formulated. Meta-training consists of multiple optimization steps, namely inner loop optimization and outer loop optimization. The inner loop optimization module 210 performs the inner loop optimization steps on task-specific data. In addition, the inner loop optimization module 210 may utilize both self-supervised and semi-supervised training schemes. The outer loop optimization module 220 performs the outer loop optimization steps on data across tasks. Thus, the segmentation system 120 invokes self-supervised semi-supervised meta-learning in order to benefit from the high-level representations learned via self-supervision, the task-relevant representations learned via supervision, and the fast adoption properties imbued by meta-learning.

The inner optimization loop module 210 performs inner loop optimization on task-specific data and allows for task-specific parameter updates. As an example, a single update step for a given set of task-specific initialization parameters, $\theta_t$, a task-specific objective function, $\mathcal{L}_t$, and a learning rate, $\eta$, may be defined according to Equation 1.

$$\theta_t \leftarrow \theta_t - \eta \frac{\partial \mathcal{L}_t}{\partial \theta_t} \quad (1)$$

Because tasks consist of data that are either labeled or unlabeled, the inner loop module 210 optimizes either a supervised loss, $\mathcal{L}_{super}$, or a self-supervised loss, $\mathcal{L}_{self}$. In some embodiments, the supervised loss is a cross-entropy loss, such as that defined by Equation 2.

$$\mathcal{L}_{super} = -\sum_{i=1}^{B}\sum_{H,W} \log h_{\phi\theta}(y_i^{H,W} = c_i^{H,W} \mid x_i) \quad (2)$$

In these embodiments, an encoder, $f_\theta$, may map images X, with height H and width W into D-dimensional representations, V. A decoder, $g_\phi$, may map the representations, V, into segmentation maps, Y, that consist of C classes. Given an instance, $x_i$, the per-pixel ground-truth-label, $c_i^{H,W}$, and output, $y_i^{H,W}$, $h_{\phi\theta} = g_\phi \circ f_\theta$ is learned in accordance with Equation 2. In Equation 2, $h_{\phi\theta}(y_i^{H,W} = c_i^{H,W} \mid x_i)$ is the probability assigned to the ground-truth label per pixel.

In some embodiments, the self-supervised loss is a contrastive loss, such as that defined by Equation 3. In an embodiment, in contrastive learning, an instance is augmented to generate $x_A^i = T_A(x_i)$ and $x_B^i = T_B(x_i)$ using stochastic transformation operators, $T_A$ and $T_B$. Representations, $v_A^i = f_\theta(x_i^A)$ and $v_B^i = f_\theta(x_i^B)$, of the pair of augmented instances are encouraged to be similar to one another using a similarity metric, s, as shown in Equation 4. The pair of augmented instances may be further encouraged to be dissimilar to other instances. Thus, given a batch of size B and a temperature parameter, $\tau$, the objective function for self-supervised learning is optimized in accordance with Equation 3.

$$\mathcal{L}_{self}(v_a, v_b) = -\mathbb{E}_{i \in B}\left[\log \frac{e^{s(v_A^i, v_B^i)}}{\sum_j e^{s(v_A^i, v_B^j)}}\right] \quad (3)$$

$$s(v_A^i, v_B^i) = \frac{f_\theta(x_A^i) \cdot f_\theta(x_B^i)}{\|f_\theta(x_A^i)\| \, \|f_\theta(x_B^i)\|} \frac{1}{\tau}$$

In some embodiments, self-supervised training and supervised training are performed by the same module, such as the inner optimization loop module 210. In additional and/or alternative embodiments, one or more portions of the training are performed at one location and one or more portions of the training are performed at one or more different locations. For example, the self-supervised training may be performed on one server and the supervised training may be performed on one or more different servers and/or on one or more client devices, such as client devices 110A, 110B.

In some embodiments, the inner loop optimization module 210 optimizes the self-supervised objective concurrently with the supervised objective. In other embodiments, the inner loop optimization module 210 uses a sequential meta-training procedure. In the sequential meta-training procedure, the inner loop optimization module 210 performs self-supervised meta-training on unlabeled data. The learned parameters from the self-supervised meta-training are then used to perform supervised meta-training on labeled data.

The outer optimization loop module 220 aggregates information across tasks. In particular, the task-specific parameters are aggregated to obtain a new set of initialization parameters, $\theta^{new}$, which are iteratively trained. The new set of initialization parameters, $\theta^{new}$, are used to solve downstream tasks during meta-testing, performed by the testing module 230.

In some embodiments, the outer optimization step treats the distance between the initialization parameters, $\theta$, and the average task-specific parameters, $\theta_t$, as the objective function to be optimized. In these embodiments, given a learning rate, $\alpha$, the update step is defined in accordance with Equation 5.

$$\theta \leftarrow \theta - \alpha \sum_{t=1}^{T}(\theta - \theta_t) \quad (5)$$

In other embodiments, each task, t, is associated with a manifold, M, represented by a loss surface. As parameters are updated during training, the loss surface is traversed until an optimum is reached. To obtain a parameter initialization, $\theta$, that quickly converges, the expected length, d, of the traversed path is minimized across all tasks, T. In these embodiments, the update step is defined in accordance with Equation 6.

$$\theta = \theta - \alpha \nabla \mathbb{E}_T[d(\Lambda, M)] \quad (6)$$

Testing module 230 tests the image segmentation system 120 by testing the inner optimization loop module 210 and/or the outer optimization loop module 220. The testing module 230 may test the image segmentation system 120 using data stored in the data store 240, such as testing data. Additionally, or alternatively, the testing module 230 may test the image segmentation system 120 using data stored locally, such as data stored on client devices 110A, 110B. Furthermore, testing of one or more portions of the image segmentation system 120 may be performed locally using separately stored data. In these embodiments, one or more medical centers may each test one or more portions of the image segmentation system 120 using testing data stored by the medical centers either locally or on one or more separate servers.

The testing module 230 may test parameters learned by the inner optimization loop module 210 and/or the outer loop optimization module 220 with meta-testing. The testing module 230 can perform testing across species (e.g., human, porcine, etc.), chambers (e.g. left ventricle endocardium, left ventricle myocardium, right ventricle endocardium, left atrium endocardium, etc.), modalities (e.g. cine, late gadolinium enhancement, etc.), medical centers, and/or any combination thereof.

For example, when testing across species, the testing module 230 may perform meta-testing on data associated with a second species (e.g. porcine data) using a model learned on data associated with a first species (e.g., human data). When testing across chambers, the testing module 230 may perform meta-testing on data associated with a second chamber using a model learned on data associated with a first chamber. In addition, the testing module 230 may perform meta-testing on data associated with multiple chambers using a model learned on data associated with different multiple chambers. In addition, when testing across modalities, the testing module 230 may perform meta-testing on data associated with a second modality using a model learned on data associated with a first modality.

The data store 240 stores parameters, such as initialization parameters, task-specific parameters, aggregated parameters, and the like. The data store 240 also stores training data, such as training images. Training images may be labeled images and/or unlabeled images. Labeled images are each associated with a label indicating a feature associated with the image. The label may include a location of the feature, a size of the feature, intensity values of the feature, or the like. Labeled images are used during supervised training of the image segmentation system 200. Unlabeled images may not include a label and may be used during self-supervised training of the image segmentation system 120. Training images may be associated with a particular species, chamber, medical center, and/or modality. The data store 240 may also store image representations, segmentation maps, per-pixel ground-truth labels, loss functions, or the like. The data store 240 also stores testing data, such as testing images. Testing images may include labeled and/or unlabeled images. Testing images may be associated with a particular species, chamber, medical center, and/or modality.

EXAMPLE METHODS

Figure 3:
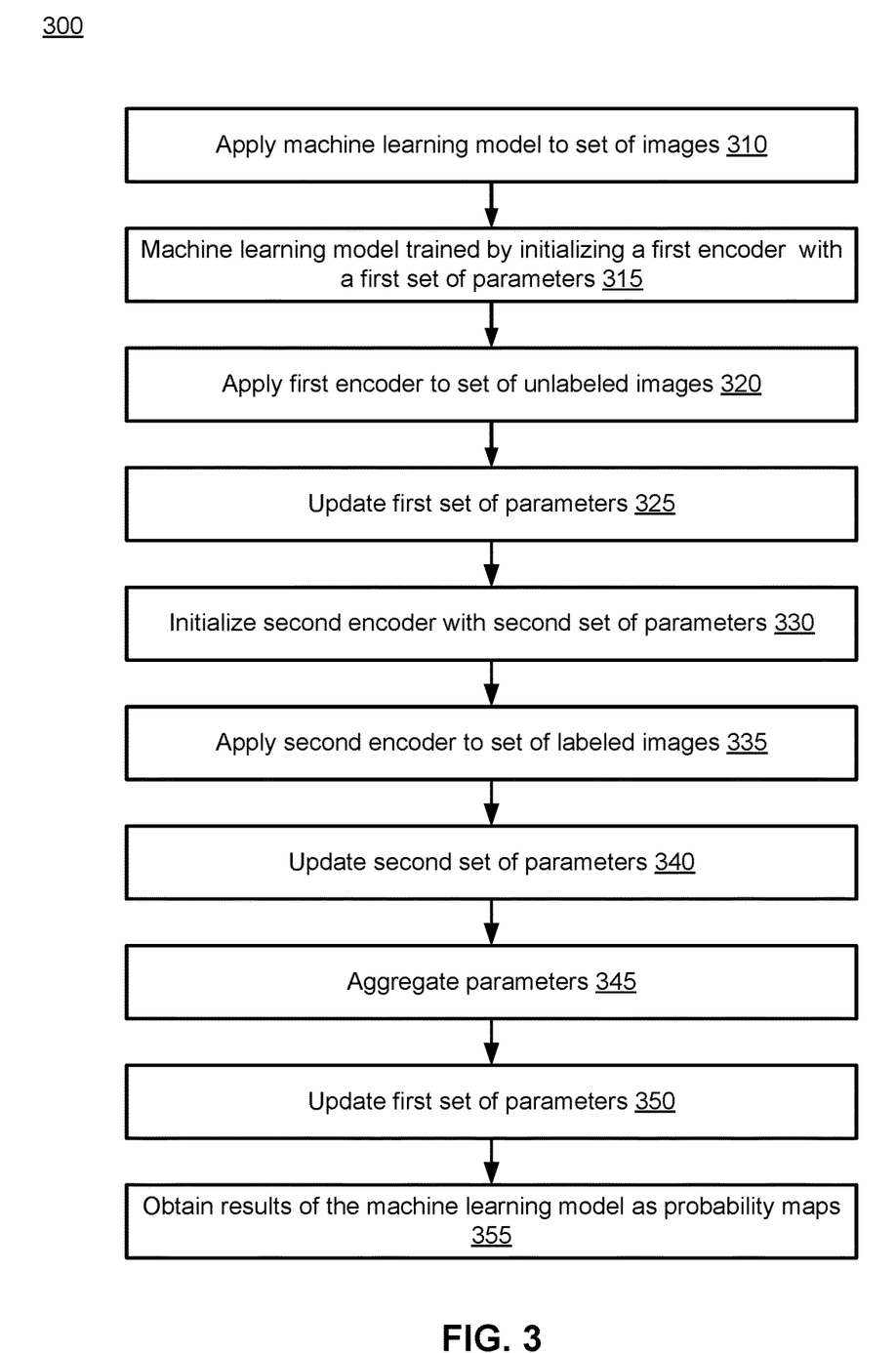
FIG. 3 is a flowchart of a method for segmenting images, according to one embodiment.

FIG. 3 is a flowchart of a method 300 for segmenting images, according to one embodiment. In the method 300 shown, a machine learning model, is applied 310 to a set of images to generate results. The machine learning model was trained by initializing 315 a first encoder, such as a task-specific inner loop associated with a first task, with a first set of parameters. The first encoder is applied 320 to a set of unlabeled images to generate a set of representations. The first set of parameters is updated 325 based on the set of representations. For example, the first set of parameters may be updated with a task-specific objective function, such as the contrastive loss.

A second encoder, such as a task-specific inner loop associated with a second task, is initialized 330 with a second set of parameters. The second encoder is applied 335 to a set of labeled images to generate a set of predictions of a location of a feature within each image in the set of labeled images. The second set of parameters is updated based 340 on the set of predictions. The parameters are aggregated 345 into a set of aggregated parameters. The first and second set of parameters are updated 350 based on the aggregated parameters. The results of the machine learning model are obtained 355 as a probability map for each image in the set of images.

Figure 4:
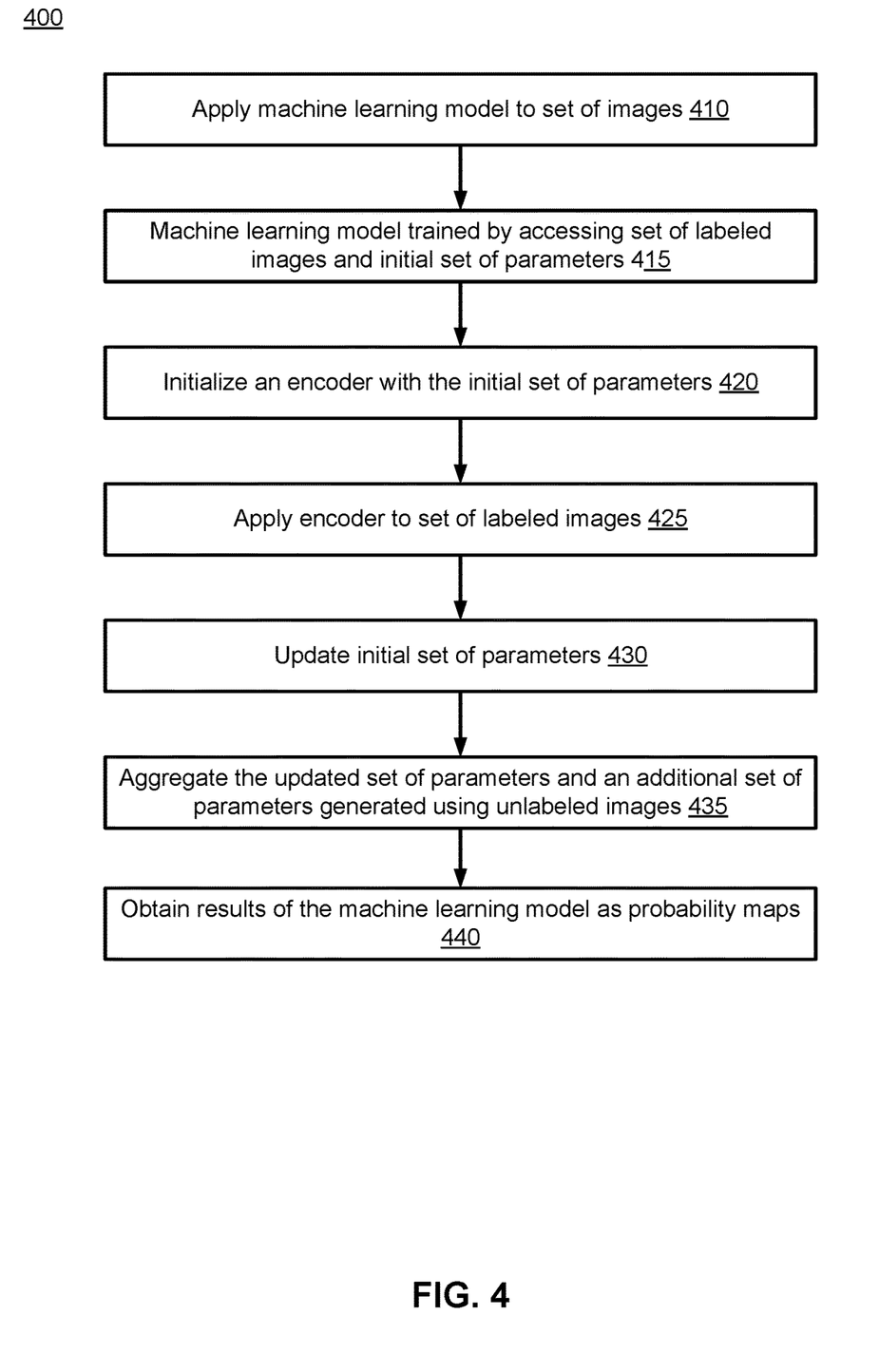
FIG. 4 is a flowchart of an additional method of segmenting images, according to one embodiment.

FIG. 4 is a flowchart of an additional method 400 of segmenting images, according to one embodiment. In the method 400 shown, a machine learning model, is applied 410 to a set of images to generate results. The machine learning model was trained by accessing 415 a set of labeled images and an initial set of parameters. Each label indicates a location of a feature within the respective image. The machine learning model was further trained by initializing 420 an encoder of the machine learning model, such as a task-specific inner loop, with the initial set of parameters. The encoder is applied 425 to a set of labeled images to generate a set prediction of the location of the feature within each image. The initial set of parameters are updated 430 based on the predictions and the label associated with each image in the set of labeled images. The updated set of parameters is aggregated 435 with an additional set of parameters. The additional set of parameters was generated using a set of unlabeled images. For example, the additional set of parameters may have been generated using self-supervised learning. The results of the machine learning model are obtained 440 as a probability map for each image in the set images.

Figure 5:
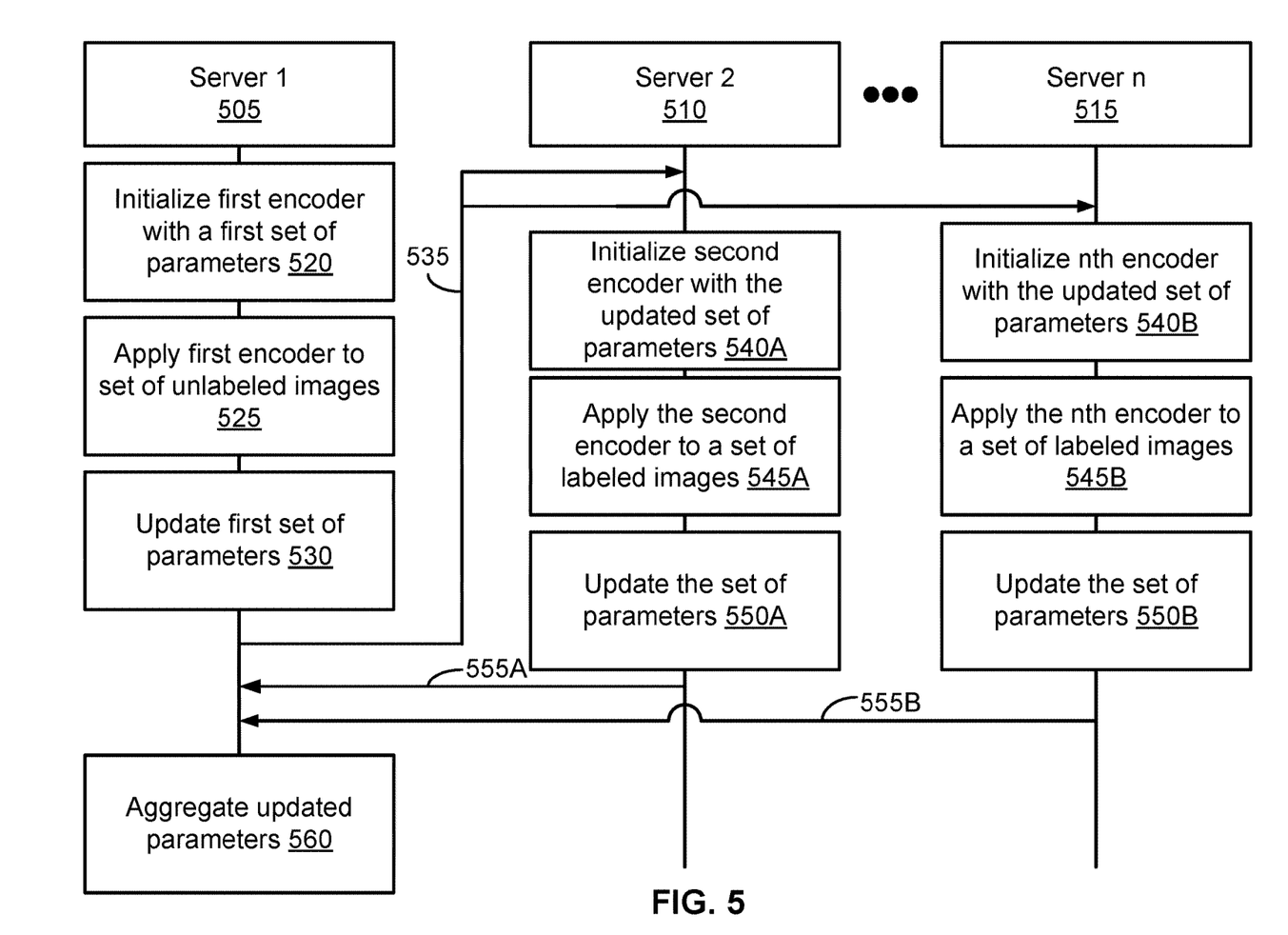
FIG. 5 is an interaction diagram illustrating a method for training the image segmentation system, according to one embodiment.

FIG. 5 is an interaction diagram illustrating a method for training the image segmentation system, according to one embodiment. The diagram shown illustrates interactions between a first server, server 1 505, a second server, server 2 510, and additional servers, through server n 515. Each server may be associated with a separate user of the image segmentation system 120, such as separate medical centers, research facilities, or the like. In the diagram shown, server 1 505 initializes 520 a first encoder with a first set of parameters. Server 1 505 applies 525 the first encoder to a set of unlabeled images to generate representations of the unlabeled images in the set. Server 1 505 updates the first set of parameters based on the representations to obtain task-specific parameters. The additional servers, server 2 510 through server n 515, receive 535 the updated set of parameters from the first server, server 1 505.

The additional servers initialize 540A, 540B, a respective encoder with the updated set of parameters. The additional servers apply 545A, 545B the corresponding encoder to a set of labeled images to generate predictions of a location of a feature with the labeled images. Further, the additional servers update 550A, 550B the set of parameters based on the predictions to generate task-specific parameters corresponding to each respective encoder. The first server, server 1 505, receives 555A, 555B and aggregates 560 the updated sets of parameters from the additional servers to generate a new set of initialization parameters. The aggregated parameters may then be iteratively trained.

Figure 6:
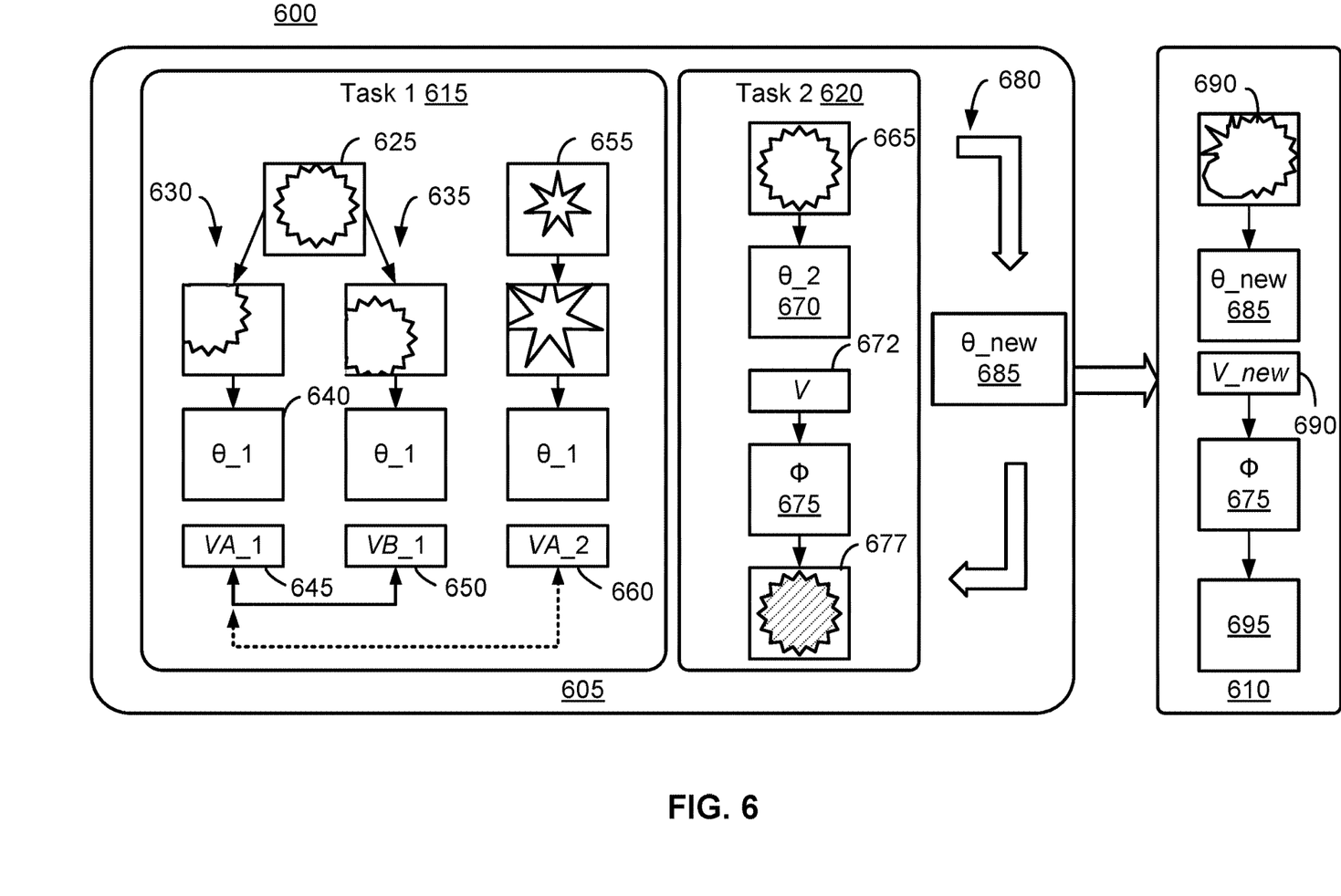
FIG. 6 is a block diagram illustrating a method for segmenting images, according to one embodiment.

FIG. 6 is a block diagram 600 illustrating a method for segmenting images, according to one embodiment. The block diagram 600 illustrates the both stages of meta-learning, namely meta-training 605 and meta-testing 610. In meta-training 605, tasks, such as task 1 615 and task 2 620, are solved to obtain task-specific parameters. Tasks may be solved with self-supervision or with supervision. In the block diagram 600 shown, task 1 615 is solved with self-supervision and task 2 620 is solved with supervision. Tasks may be solved independently of one another. Alternatively, or additionally, tasks solutions may be dependent on one another. In one embodiment, the task-specific parameters of a first task may be used to obtain the task-specific parameters associated with the second task. For example, the task-specific parameters solved for task 1 615 may be used during supervised meta-training for tasks consisting of labeled data, such as task 2 620.

In some embodiments, a contrastive learning algorithm is used to solve tasks via self-supervised learning. As shown, an instance 625 is augmented to generate two augmented instances 630 and 635. Augmented instances may be generated using stochastic transformation operators, as discussed with respect to FIG. 2. Using the task specific parameters $\theta\_1$ 640, representations of the augmented instances are generated, VA_1 645 and VB_1 650. For example, the task specific parameters $\theta\_1$ 640 may be the parameters of a neural network, and the one or more images are fed into the neural network to generate representations of the images (e.g., feature vectors). Separately, either concurrently or sequentially, representations of other instances, such as instance 655, may be generated using the task specific parameters. As shown, instance 655 is represented by representation VA_2 660.

The representations of pair of augmented instances, VA_1 645 and VB_1 650 are encouraged to be similar to one another. In some embodiments, representations may be encouraged to be similar to one another using a similarity metric, such as the one discussed with respect to FIG. 2. This is shown via the closed line connecting representation VA_1 645 and VB_1 650. In addition, representations of the pair of augmented instances, VA_1 645 and VB_1 650 are encouraged to be dissimilar to representations of other instances, such as representation VA_2 660 of instance 655. This is shown via the dotted line connecting representation VA_1 645 and VA_2 660.

In task 2 620, labeled images, such as image 665, are used to obtain task-specific parameters $\theta\_2$ 670 associated with the second task. Using the task specific parameters θ_2 670, representations 672 of images are generated, such as image 665. For example, the task specific parameters θ_2 670 may be the parameters of a neural network that generates a feature vector representation 672 of an image 665. Segmentation masks 677 are generated from the representations 672 via a decoder 675. The segmentation mask includes the probability of a feature at each location in the image 665. The task-specific parameters are aggregated across all tasks to obtain a new set of initialization parameters, θ_new 685. The new set of initialization parameters, θ_new 685 may be iteratively trained.

During meta-testing 610, the new set of initialization parameters, θ_new 685 are used to solve downstream tasks, such as segmenting images. As shown, the new set of initialization parameters, θ_new 685 are used to segment a new image 690 to generate a representation of the image, V_new 690. A decoder 675 generates a segmentation mask 695 from the representation of the image V_new 690. In some embodiments, during meta-testing 610, the new set of initialization parameter θ_new 685 may be used to segment images associated with a species, chamber, modality, medical center, etc. that is different from a species, chamber, modality, medical center, etc. from the images during meta-training 605.

Computing System Architecture

Figure 7:
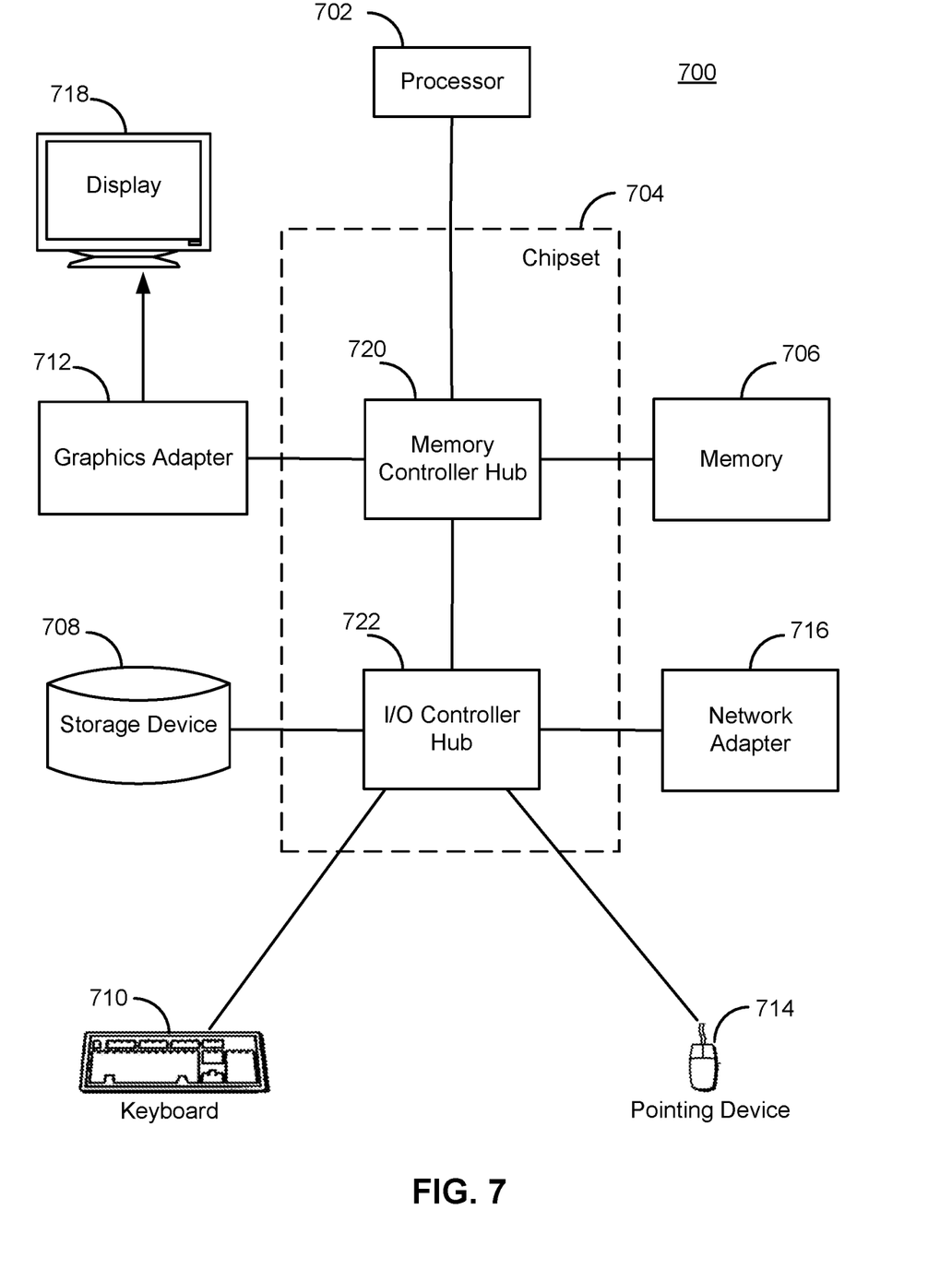
FIG. 7 is a block diagram illustrating an example of a computer suitable for use in the image segmentation system of FIG. 1, according to one embodiment.

FIG. 7 is a high-level block diagram illustrating an example computer 700 suitable for use as an image segmentation system. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks.

The types of computers used by the entities of FIGS. 1-2 can vary depending upon the embodiment and the processing power required by the entity. For example, the image segmentation system 200 might include multiple blade servers working together to provide the functionality described. Furthermore, the computers can lack some of the components described above, such as keyboards 710, graphics adapters 712, and displays 718.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for segmenting images. Thus, while particular embodiments and applications have been illustrated and described, it is to be understood that the described subject matter is not limited to the precise construction and components disclosed. The scope of protection should be limited only by the following claims.

What is claimed is:

1. A computer implemented method of segmenting a set of images comprising:
   applying a machine learning model to the set of images to generate results, wherein the machine learning model was trained by:
   initializing a first encoder with a first set of parameters,
   applying the first encoder to a set of unlabeled images to generate a set of representations of the unlabeled images,
   updating the first set of parameters based on the set of representations, initializing a second encoder with a second set of parameters,
   applying the second encoder to a set of labeled images to generate a set of predictions of a location of a feature within each image in the set of labeled images, wherein each respective label is associated with the location of the feature in the respective labeled image,
   updating the second set of parameters based on the set of predictions, aggregating the updated first set of parameters and the updated second set of parameters into a set of aggregated parameters, and updating the first set of parameters based on the set of aggregated parameters; and obtaining the results of the machine learning model as a probability map for each image in the set of images.

2. The method of claim 1, wherein the second set of parameters is the updated first set of parameters.

3. The method of claim 1, wherein the first encoder is optimized according to a self-supervised loss function.

4. The method of claim 3, wherein optimizing the first encoder comprises:

augmenting an instance of an image in the set of unlabeled imaged with one or more transformation operators to generate a plurality of augmented instances;

encoding the plurality of augmented instances to generate representations of the plurality of augmented instances; and applying a similarity metric to the representations of the plurality of augmented instances.

5. The method of claim 1, wherein the second encoder is optimized according to a cross entropy loss function.

6. The method of claim 5, wherein optimizing the second encoder comprises:

mapping the set of labeled images into D-dimensional representations with the second encoder; and mapping the representations into segmentation maps consisting of a set of classes with a decoder.

7. The method of claim 1, wherein the first encoder is associated with a first task and wherein the second encoder is associated with a second task.

8. The method of claim 7, wherein aggregating the updated first set of parameters and the updated second set of parameters comprises generating new parameters based on an update step that is defined by:

$$\theta = \theta - \alpha \sum_{t=1}^{T} (\theta - \theta_t),$$

wherein $\theta$ are initialization parameters, $\alpha$ is a learning rate, t is a task, and $\theta_t$ are task-specific parameters.

9. The method of claim 7, wherein aggregating the updated first set of parameters and the updated second set of parameters comprises generating new parameters based on an update step that is defined by:

$\theta = \theta - \alpha \nabla \mathbb{E} E_T[d(\theta, M)]$, wherein $\theta$ are initialization parameters, $\alpha$ is a learning rate, and M is a manifold associated with each task, t, in a set of T tasks.

10. The method of claim 1, wherein the set of unlabeled images and the set of labeled images are each associated with at least one of a first species, a first chamber, or a first modality, the method further comprising testing the machine learning model with a set of testing images, wherein the set of testing images are associated with at least one of a second species, a second chamber, or a second modality.

11. A non-transitory computer-readable storage medium having instructions encoded thereon that, when executed by one or more processors, cause the one or more processors to:

apply a machine learning model to a set of images to generate results, wherein the machine learning model was trained by:

initializing a first encoder with a first set of parameters, applying the first encoder to a set of unlabeled images to generate a set of representations of the unlabeled images, updating the first set of parameters based on the set of representations, initializing a second encoder with a second set of parameters, applying the second encoder to a set of labeled images to generate a set of predictions of a location of a feature within each image in the set of labeled images, wherein each respective label is associated with the location of the feature in the respective labeled image, updating the second set of parameters based on the set of predictions, aggregating the updated first set of parameters and the updated second set of parameters into a set of aggregated parameters, and updating the first set of parameters based on the set of aggregated parameters; and obtain the results of the machine learning model as a probability map for each image in the set of images.

12. The non-transitory computer-readable storage medium of claim 11, wherein the second set of parameters is the updated first set of parameters.

13. The non-transitory computer-readable storage medium of claim 11, wherein the first encoder is optimized according to a self-supervised loss function.

14. The non-transitory computer-readable storage medium of claim 13, wherein optimizing the first encoder comprises:

augmenting an instance of an image in the set of unlabeled imaged with one or more transformation operators to generate a plurality of augmented instances;

encoding the plurality of augmented instances to generate representations of the plurality of augmented instances; and applying a similarity metric to the representations of the plurality of augmented instances.

15. The non-transitory computer-readable storage medium of claim 11, wherein the second encoder is optimized according to a cross entropy loss function.

16. The non-transitory computer-readable storage medium of claim 15, wherein optimizing the second encoder comprises:

mapping the set of labeled images into D-dimensional representations with the second encoder; and mapping the representations into segmentation maps consisting of a set of classes with a decoder.

17. The non-transitory computer-readable storage medium of claim 11, wherein the first encoder is associated with a first task and wherein the second encoder is associated with a second task.

18. The non-transitory computer-readable storage medium of claim 17, wherein aggregating the updated first set of parameters and the updated second set of parameters comprises generating new parameters based on an update step that is defined by:

$$\theta = \theta - \alpha \sum_{t=1}^{T} (\theta - \theta_t),$$

wherein $\theta$ are initialization parameters, $\alpha$ is a learning rate, t is a task, and $\theta_t$ are task-specific parameters.

19. The non-transitory computer-readable storage medium of claim 17, wherein aggregating the updated first set of parameters and the updated second set of parameters comprises generating new parameters based on an update step that is defined by:

$\theta=\theta-\alpha\nabla\mathbb{E}_T[d(\theta,M)]$, wherein $\theta$ are initialization parameters, $\alpha$ is a learning rate, and M is a manifold associated with each task, t, in a set of T tasks.

20. The non-transitory computer-readable storage medium of claim 11, wherein the set of unlabeled images and the set of labeled images are each associated with at least one of a first species, a first chamber, or a first modality, and wherein the instructions further cause the one or more processors to test the machine learning model with a set of testing images, wherein the set of testing images are associated with at least one of a second species, a second chamber, or a second modality.

* * * * *

UNITED STATES PATENT AND TRADEMARK OFFICE
CERTIFICATE OF CORRECTION

| | | |
|---|---|---|
| PATENT NO. | : 12,002,202 B2 | |
| APPLICATION NO. | : 17/397334 | |
| DATED | : June 4, 2024 | |
| INVENTOR(S) | : Kiyasseh et al. | |

It is certified that error appears in the above-identified patent and that said Letters Patent is hereby corrected as shown below:

In the Claims

In Column 11, in Claim 9, Line 48, delete "$\theta=\theta-\alpha\nabla^{\mathbb{E}} \text{ } E_T[d(\theta,M)]$," and insert -- $\theta=\theta-\alpha\nabla^{\mathbb{E}}_T[d(\theta,M)]$, --, therefor.

In Column 13, in Claim 19, Line 1, delete "$\theta=\theta-\alpha\nabla^{\mathbb{E}} \text{ }_T[d(\theta,M)]$," and insert -- $\theta=\theta-\alpha\nabla^{\mathbb{E}}_T[d(\theta,M)]$, --, therefor.

Signed and Sealed this
Fifth Day of November, 2024

Katherine Kelly Vidal
*Director of the United States Patent and Trademark Office*